F. F. SKEEL & J. J. DOSSERT.
ELECTRICAL CONNECTION AND BOX.
APPLICATION FILED JULY 27, 1914.
1,283,339.
Patented Oct. 29, 1918.
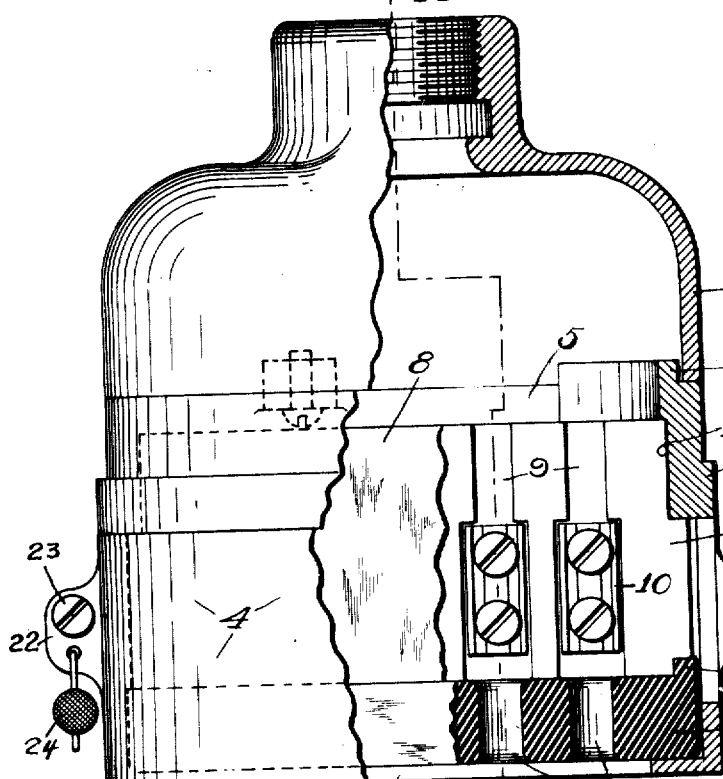
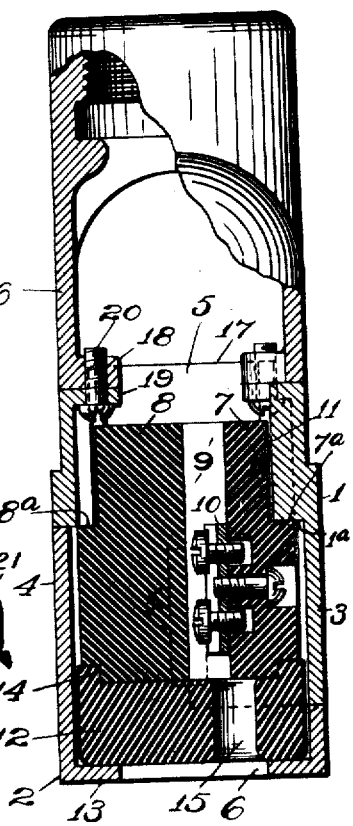
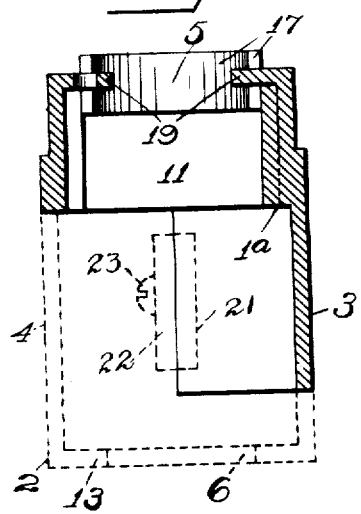
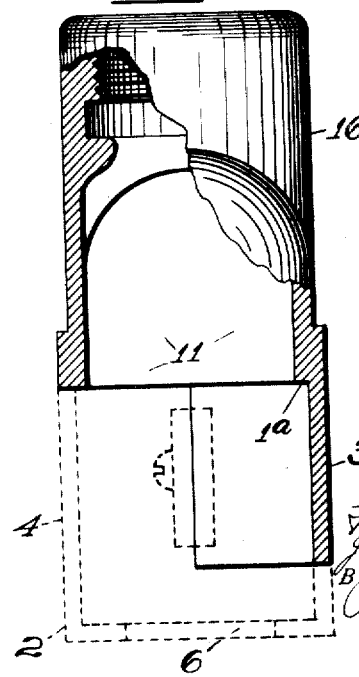
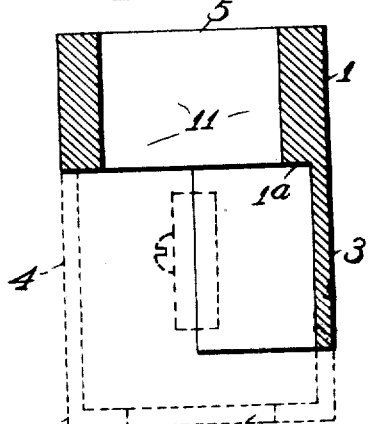
WITNESSES:
CC Schorneck
Chas H Young
INVENTORS
Frederick F Skeel
John J Dossert
BY
Parsons Bodell
ATTORNEYS

UNITED STATES PATENT OFFICE.

FREDERICK F. SKEEL, OF CHICAGO, ILLINOIS, AND JOHN J. DOSSERT, OF SYRACUSE, NEW YORK, ASSIGNORS TO CROUSE-HINDS COMPANY, OF SYRACUSE, NEW YORK, A CORPORATION OF NEW YORK.

ELECTRICAL CONNECTION AND BOX.

1,283,339.

Specification of Letters Patent.

Patented Oct. 29, 1918.

Application filed July 27, 1914. Serial No. 853,320.

*To all whom it may concern:*

Be it known that we, FREDERICK F. SKEEL, a citizen of the United States, and residing in Chicago, in the county of Cook and State of Illinois, and JOHN J. DOSSERT, a citizen of the United States, residing in Syracuse, in the county of Onondaga and State of New York, have invented a certain new and useful Electrical Connection and Box, of which the following is a specification.

This invention has for its object an electrical connection and box therefor which is particularly applicable for use with conduit outlet boxes and in connection with meters; and the invention consists in the novel combinations and constructions hereinafter set forth and claimed.

In describing this invention, reference is had to the accompanying drawings, in which like characters designate corresponding parts in all the views.

Figure 1 is a sectional view, partly in elevation of a preferable form of our invention.

Fig. 2 is a sectional view on the plane of line A—A, Fig. 1, partly in elevation.

Fig. 3 is a sectional view of the base section of the box, the cap section being shown in dotted lines.

Fig. 4 is a modified view of the base section which is formed with a conduit outlet box integral therewith, the cap section being also shown in dotted lines.

Fig. 5 is another modified form of the base section when the same is designed to be used without being connected to the conduit outlet box shown in Figs. 1 and 2.

The box comprises, preferably, two complemental sections open at their outer ends for the ingress and egress of the wires. Each box section, as here shown, includes an end portion and practically one-half of the intermediate part of the box which part is divided longitudinally, the end portions remaining intact.

The electrical connection comprises blocks of insulation, both of which are formed with complemental shank portions which fit the base section of the box, one of the blocks lying on the intermediate wall of the base section and the other lying contiguous to the intermediate wall of the cap section, the blocks inclosing a passage between them which opens toward opposite ends of the box, and one of the blocks, that is, the base block which lies wholly within the base box section, is provided with terminals thereon located at one side of the center of the box. As here shown, there are a plurality of passages, Fig. 1, each having terminals therein and the box is elongated in form and has elongated openings at its opposite ends.

The entrance piece is located in the cap section between the electrical connections, and the open end of the cap section, this entrance piece having a wire passage therethrough and being reversible for bringing the passage located nearer one edge thereof than the other into or out of alinement with the wire passage of the connection.

The base section of the box may be formed integral with the conduit outlet box, or may be designed to be attached to the conduit outlet box, or to be used independently of a conduit outlet box.

1 is the base section of the box, 2 the cap section, and 3 designates the intermediate wall of the box, which wall is part of the base section. 4 is the intermediate wall of the box which wall is part of the cap section, the intermediate portion of the box being divided longitudinally so that each section 1 and 2 includes one-half of the intermediate portion of the box divided longitudinally of the box. The ends remain intact, that is, they are not divided. The sections 1 and 2 are provided with elongated openings 5, 6 at opposite ends of the box.

7 and 8 designate, respectively, the base and cap sections of the insulating body of the electrical connection, which form between them passages 9 extending lengthwise thereof and opening toward opposite ends of the box, the base block having wire terminals or binding devices 10 thereon located within the passages 9. The blocks 7, 8 are formed with reduced shank portions at their inner ends which fit into the passage 11 of the base, and which form shoulders 7[a], 8[a] engaging an internal shoulder 1[a] on the section 1. The shoulder 1[a] is formed by forming the interior dimensions of the end of the base sections less than the interior dimensions of the intermediate walls 3, 4 of the box. The side walls of the passage 9 may be formed by barriers provided on either block 7, 8 and abutting against the other block and as here shown, these barriers are formed on the base block 7.

12 is an entrance piece or member located in the cap section in position to form a closure for the open end thereof and occupying the space between the outer ends of the blocks 7, 8 and the end wall of the cap section. The entrance piece is of substantially the same outline or plan as the outer face of the assembled blocks 7, 8, and when in position forms a cap for both blocks. The entrance piece 12 is held in position by inturned marginal flanges 13 at the open end of the cap section 2 and usually the entrance piece is formed with a marginal bead 14 on its rear side which fits into a complemental rabbet in the opposing end of the block 7, 8 and hence secures the blocks together at their outer ends. This entrance piece is also insulation and is formed with wire openings 15, located nearer one edge thereof than the other and is reversible for bringing said wire openings into or out of alinement with the passages 9.

16 is the conduit outlet box upon which the base section 1 is mounted, the base section being formed with an inset flange or bead 17 which fits into the open end of the box 16 and laps the inner face of the wall thereof.

Conduit outlet boxes with which this appliance is designed to be used, are usually formed with internal lugs 18 which receive the screws of covers or closures and when the box of the electrical connection is designed to be mounted on the conduit outlet box, it is formed with lugs 19 arranged to come into alinement with the lugs 18 of the conduit outlet box in order that fastening screws 20 may be passed through the lugs 18, 19. However, as seen in Fig. 4, the conduit outlet box may be formed integral with the base section of the connection box, or as seen in Fig. 5, the base section may be unprovided with the lugs 18, 19 on the flange 17.

The sections 1, 2 are provided with laterally extending perforated ears 21, 22, on the walls 3, 4 thereof and are held together by means as screws 23 passing through alined perforations of the ears. A seal 24 may be passed through the ears.

In operation, when it is desired to connect to a meter the wires inclosed by the conduit connected to the box 16, which wires are connected to the terminals 10, the cap section 2 is removed and the cap block 8 also removed so that the wire terminals are exposed, as clearly seen in Fig. 1, and hence wires which are connected to the meter can be readily connected to the terminals 10, said wires having been first passed through the wire holes of the entrance piece 12. The block 8 is then replaced in position with its shank in the base section 1 and the cap section 2 of the box again replaced and sealed. The entrance piece is normally arranged with the wire holes 15 out of alinement with the wire passages 9 and before the wires of the meter are passed therethrough, this entrance piece is reversed so that when the parts are again assembled, the wire holes 15 are alined with the passages 9.

What we claim is:

1. The combination of a box comprising complemental base and cap sections, and an electrical connection comprising blocks complemental to each other and formed with wire passages between them, the blocks having body and shank portions, the shank portions being slidable into and out of the base section, upon an endwise movement of the blocks, the base section inclosing the body of one of the blocks and the cap section and inclosing the body of the other block, substantially as and for the purpose described.

2. The combination of a block comprising base and cap sections, and an electrical connection comprising blocks having portions slidable into and out of the base section upon an endwise movement of the blocks, the blocks being formed with wire passages between them, the base section inclosing one block and the cap section partly inclosing the other block, and an entrance piece at the outer ends of the blocks and common to both blocks, the entrance piece extending into the cap section, substantially as and for the purpose specified.

3. The combination of a box and an electrical connection including complemental blocks slidable lengthwise into the box and being separable from each other along a line extending lengthwise of the box and the blocks, the blocks inclosing a wire passage between them, a terminal in the passage, and an entrance piece common to both blocks and having a wire hole for alinement with the passage, substantially as and for the purpose specified.

4. The combination of a box comprising complemental base and cap sections, and an electrical connection comprising blocks having portions slidably fitting in the base section, one block lying wholly in one section and the other section inclosing a portion of the other block, the blocks inclosing a wire passage, a terminal in the passage, and an entrance piece in the cap section having a wire hole for alinement with the passage, substantially as and for the purpose specified.

5. The combination of a box, and an electrical connection comprising blocks having their inner end portions slidably fitting the box, the blocks including a wire passage between them, terminals in the passage, and an entrance piece mounted on the outer ends of the blocks and being common to both of said blocks and having a wire hole for alinement with the passage, the entrance piece having means for engaging the blocks and holding the same from separating at their outer ends, substantially as and for the purpose specified.

6. The combination of a box, and an electrical connection comprising blocks having portions slidably fitting the box, the blocks including a wire passage between them, terminals in the passage, and an entrance piece mounted on the outer ends of the blocks and being common to both blocks and having a wire hole for alinement with the passage, the entrance piece being formed with a bead, and the blocks being formed with grooves for receiving the bead, the groove and the bead serving to hold the entrance piece and the blocks in assembled relation, substantially as and for the purpose set forth.

7. The combination of a box, and an electrical connection comprising blocks divided in a direction longitudinally of the box and having shank portions at their inner ends fitting the box, and a member mounted on the opposite ends of the blocks and engaging the blocks for holding the same from separating, substantially as and for the purpose described.

8. The combination of a box comprising complemental base and cap sections, and an electrical connection comprising blocks having portions slidably fitting in the box, the blocks inclosing a wire passage, terminals in the passage, and an entrance piece in the cap section and having a wire hole therein, said piece being reversible for bringing the hole into and out of alinement with the passage, substantially as and for the purpose specified.

9. The combination of a box comprising two complemental sections open at their ends, and an electrical connection including blocks of insulation, one being located entirely in one section and the other extending into both sections, the blocks having opposing faces engaging each other inclosing a wire passage between them opening toward the open ends of the box, and terminals mounted on one of the blocks and in said passage, substantially as and for the purpose set forth.

10. The combination of a box comprising two complemental sections open at their ends, and an electrical connection located in the box and including sections of insulation having opposing faces engaging each other and inclosing a passage opening toward the open ends of the box, and an entrance piece interposed between the blocks and one end of the box and having a wire passage, the entrance piece lying against both the blocks, substantially as and for the purpose described.

11. The combination of a box comprising two complemental sections open at their ends, and an electrical connection located in the box and including sections of insulation inclosing a passage opening toward the open ends of the box, and an entrance piece interposed between the blocks and one end of the box and having a wire passage, the entrance piece being reversible to move the wire passage therein into or out of alinement with the passage, substantially as and for the purpose specified.

12. The combination of a box open at its opposite ends, and an electrical connection in the box including a body of insulation formed with the lengthwise wire passage opening at its ends toward the open ends of the box, terminals in said passage, and an entrance piece located in one end of the box and having a wire hole for alinement with the passage of the base, the entrance piece being reversible for moving the hole into or out of alinement with the passage, substantially as and for the purpose set forth.

13. The combination of a box divided longitudinally of its intermediate portion into two complemental sections having their end portions intact, each section including an end portion and a part of the side wall of the box, and an electrical connection including a base block and a cap block both blocks having parts which are complemental to each other and lie in engagement with each other and together form a shank slidably fitting into the end portion of one box section, and one block lying contiguous to the side wall of one box section and the other block lying contiguous to the side wall of the other box section, substantially as and for the purpose described.

14. The combination of a box divided longitudinally of its intermediate portion into a base section and a cap section complemental to the base section, the end portions of the box being intact, each box section being formed with a portion of the side wall of the box which is complemental to the side wall of the other box section, and an electrical connection including a base block fitting into the base section and a cap block a portion of which is inclosed by the wall of the cap section of the box, substantially as and for the purpose specified.

15. The combination of a box divided longitudinally of its intermediate portion into a base section and a cap section complemental to the base section, the end portion of the box being intact, the box being open at its opposite ends and each section being formed with a portion of the side wall of the box which is complemental to the side wall of the other box section, and an electrical connection including a base block fitting into the base section and a cap block a portion of which is inclosed by the wall of the cap section of the box, the blocks inclosing a wire passage opening at its ends toward the open ends of the box, and an entrance piece located in the cap section and having a wire hole alined with the passage of the electrical connection, substantially as and for the purpose set forth.

16. The combination of a box open at its ends and divided longitudinally of its intermediate portion into a base section and a cap section, the end portions of the sections being intact, and each section including an end portion of the box and a portion of the intermediate part of the box, and an electrical connection including base and cap blocks of insulation, both blocks having portions which are complemental to each other and together form a shank like member fitting into the end portion of the base section, and one block lying contiguous to the intermediate portion of one box section while the other block lies contiguous to the intermediate portion of the other box section, the blocks forming a wire passage between them opening toward the open ends of the box, and terminals mounted on one block within the passage, substantially as and for the purpose specified.

17. The combination of a box open at its ends and divided longitudinally of its intermediate portion into a base section and a cap section, the end portions of the sections being intact, and each section including an end portion of the box and a portion of the intermediate part of the box, the wall of the intermediate part of the box being provided with an internal shoulder on the base section, and an electrical connection including base and cap blocks of insulation, both blocks having reduced portions fitting into an end portion of the base section, and shoulders engaging the former shoulder and one block lying contiguous to the intermediate portion of one box section while the other block lies contiguous to the intermediate portion of the other box section, the blocks forming a wire passage between them opening toward the open ends of the box, and terminals mounted on one block within the passage, substantially as and for the purpose specified.

18. The combination of a box open at its ends and divided longitudinally of its intermediate portion into a base section and a cap section, the end portions of the sections being intact, and each section including an end portion of the box and a portion of the intermediate part of the box, the wall of the intermediate part of the box being of larger diameter than the internal face of the base section thereby providing an internal shoulder on the base section, and an electrical connection including a base and a cap block of insulation, both blocks having reduced portions fitting into an end portion of the base section and shoulders engaging the former shoulder and one block lying contiguous to the intermediate portion of one box section while the other block lies contiguous to the intermediate portion of the other box section, the blocks forming a wire passage between them opening toward the open ends of the box, terminals mounted on one block within the passage, and an entrance piece located in the cap section between the blocks and the open end of the cap section, substantially as and for the purpose set forth.

19. The combination of a box including a base section and a cap section and each section including an end portion of the box and a portion of the intermediate part of the box, and an electrical connection including two blocks complemental to each other, both blocks fitting into an end portion of the base section, and an entrance piece located in the cap section between the blocks and the open end of the cap section, the entrance piece having a wire hole therethrough and being reversible for bringing the hole into or out of alinement with the passage of the block, substantially as and for the purpose described.

20. The combination with a conduit outlet box open at one side, a second box comprising a base section mounted on the open side of the former box, and a cap section mounted on the base section and being complemental thereto, and an electrical connection including a base block mounted in the base section and having wire terminals on its face, and a cap block extending into the base section of the box and removable upon the removal of the cap section of the box, substantially as and for the purpose specified.

In testimony whereof, we have hereunto signed our names in the presence of two attesting witnesses, at Syracuse, in the county of Onondaga, and State of New York, this 16th day of July, 1914.

FREDERICK F. SKEEL.
JOHN J. DOSSERT.

Witnesses:
M. E. ALLEN,
WM. CORNELL BLANDING.